Jan. 29, 1946.    E. F. ABER    2,393,727
APPARATUS FOR MANUFACTURING TOOTHED ELEMENTS
Filed Feb. 20, 1942    4 Sheets-Sheet 2
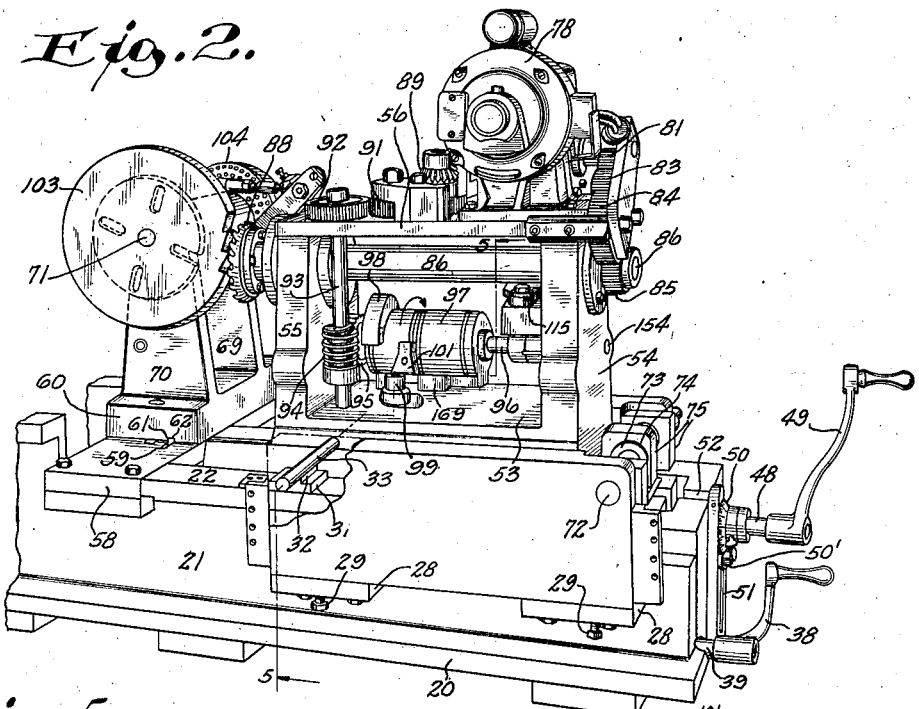
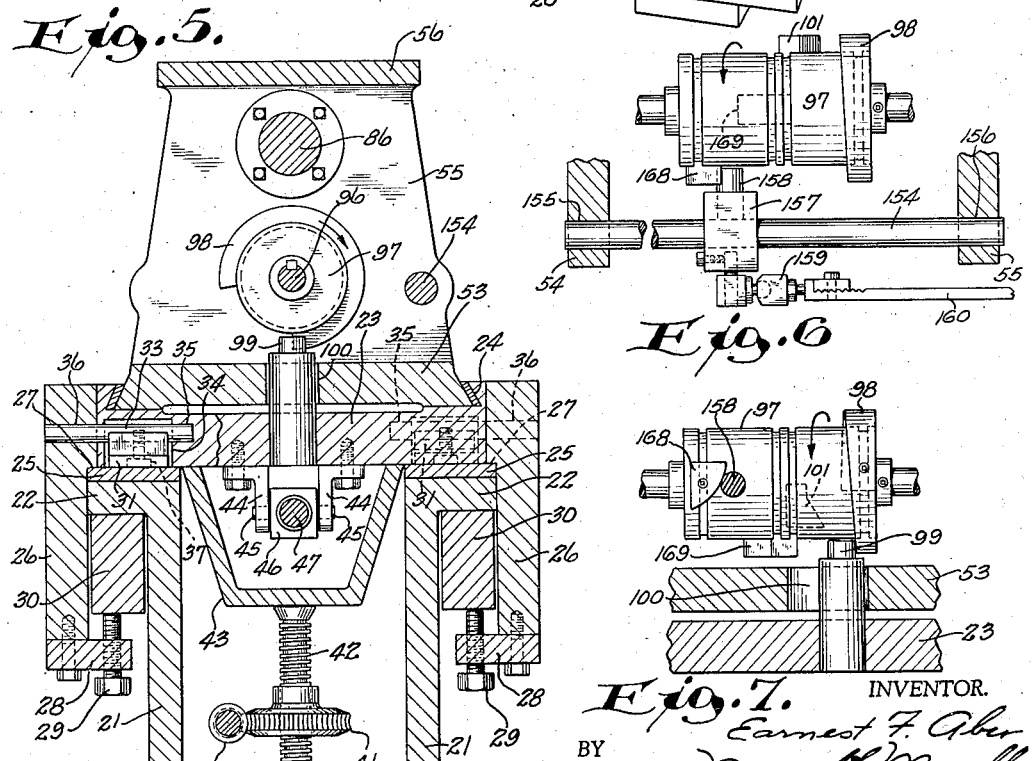
INVENTOR.
Earnest F. Aber
BY
ATTORNEYS.

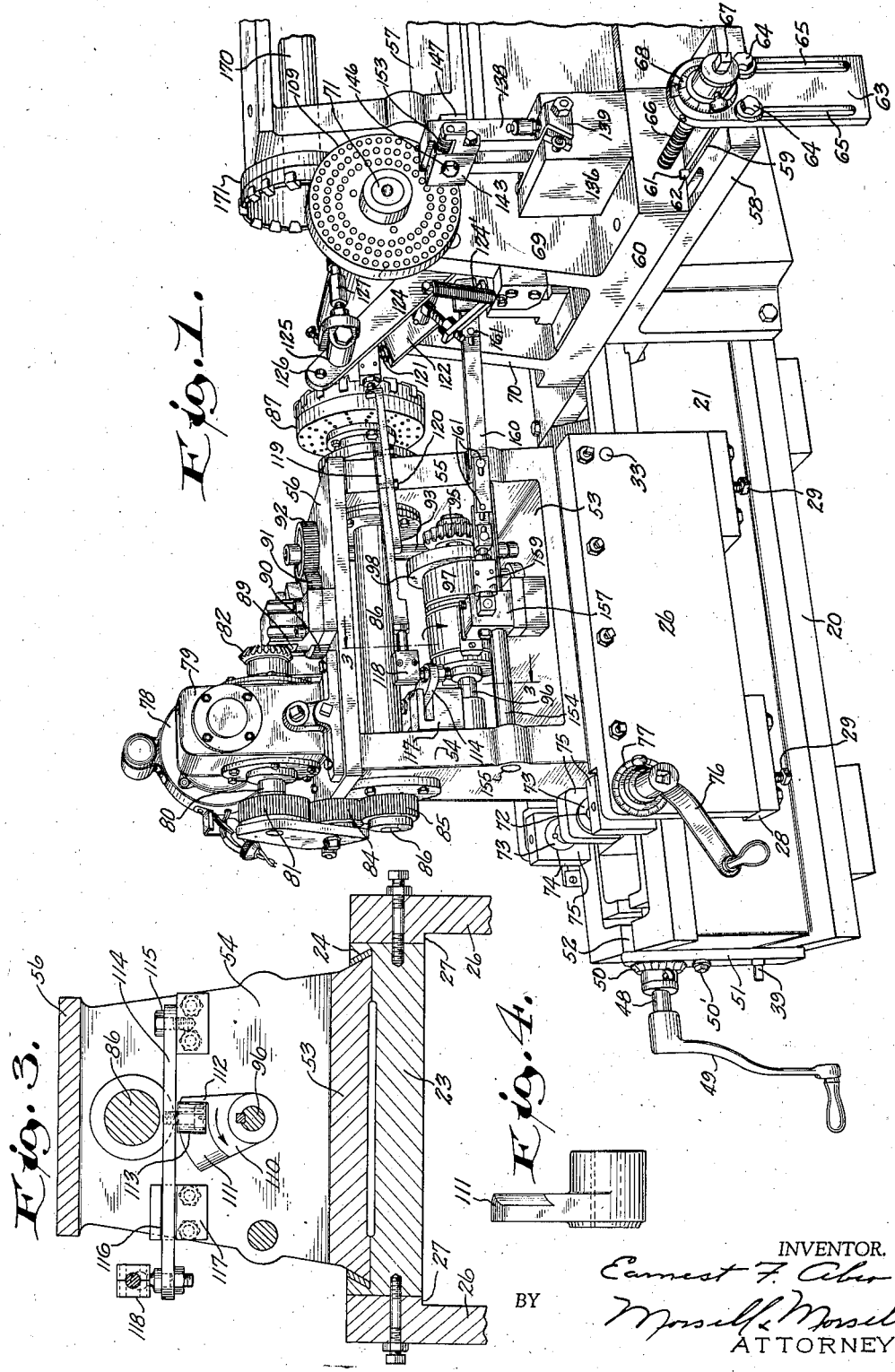

Jan. 29, 1946.  E. F. ABER  2,393,727
APPARATUS FOR MANUFACTURING TOOTHED ELEMENTS
Filed Feb. 20, 1942  4 Sheets-Sheet 3
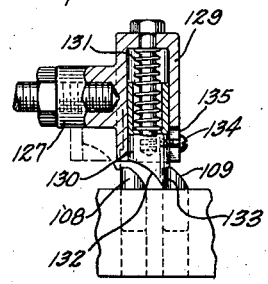
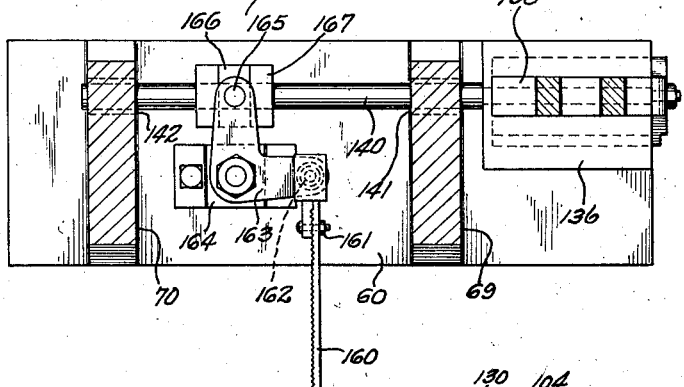
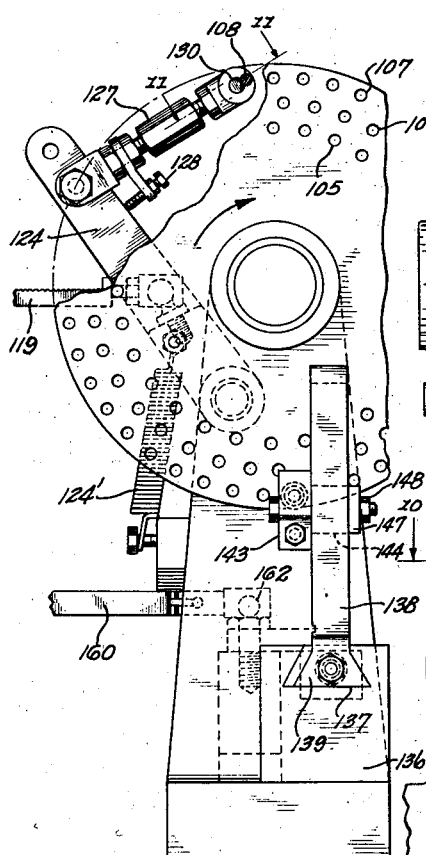
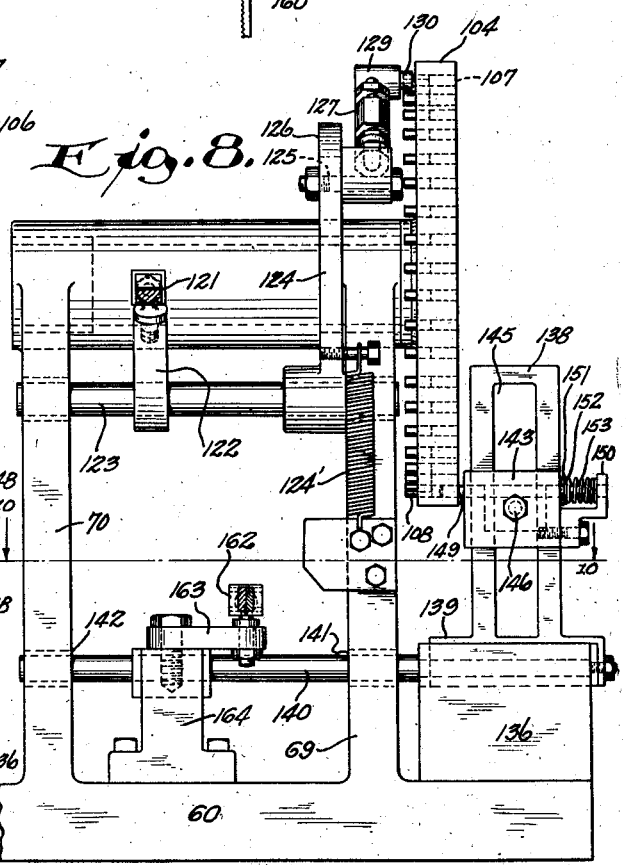
INVENTOR.
Earnest F. Aber
BY
Morsell & Morsell
ATTORNEYS.

Jan. 29, 1946. E. F. ABER 2,393,727
APPARATUS FOR MANUFACTURING TOOTHED ELEMENTS
Filed Feb. 20, 1942 4 Sheets-Sheet 4
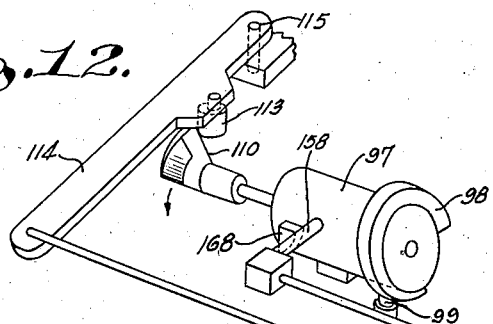
Fig. 12.
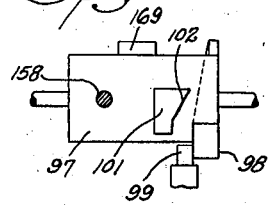
Fig. 13.
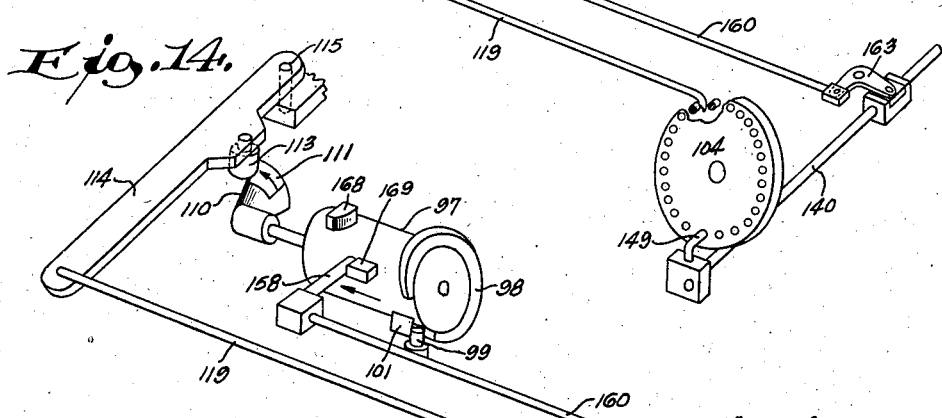
Fig. 14.
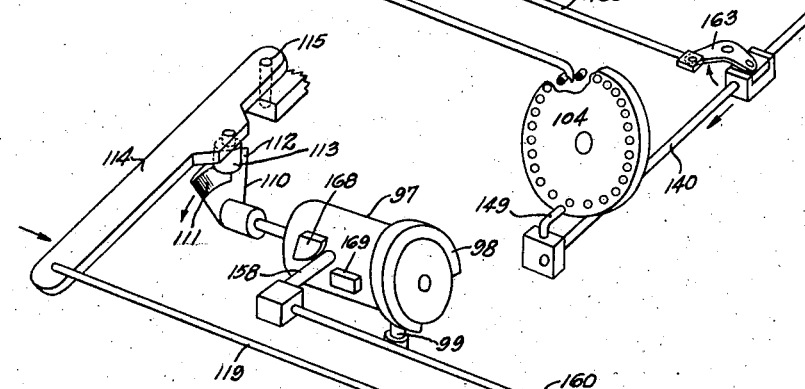
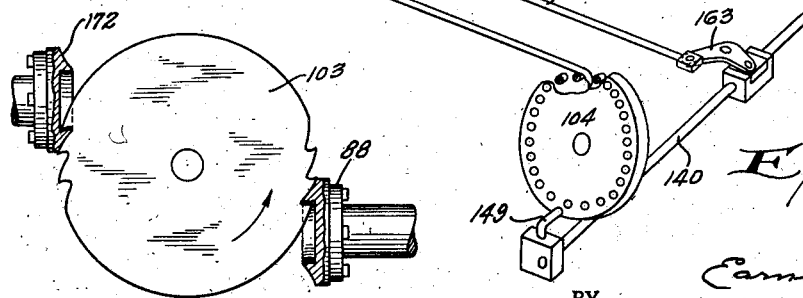
Fig. 15.
Fig. 16.
INVENTOR.
Earnest F. Aber
BY
Mosell & Mosell
ATTORNEYS.

Patented Jan. 29, 1946

2,393,727

UNITED STATES PATENT OFFICE 2,393,727

APPARATUS FOR MANUFACTURING TOOTHED ELEMENTS

Earnest F. Aber, Racine, Wis.

Application February 20, 1942, Serial No. 431,661

9 Claims. (Cl. 90—14)

This invention relates to improvements in apparatus for manufacturing toothed elements, and is particularly adapted for the manufacture of circular cutters or gears having curved teeth.

In the manufacture of circular cutters and gears, and more particularly when the teeth extend in an arc transversely of the periphery of the blank, the operation requires precise adjustments in the position of the rotary cutter with respect to the blank being operated upon, and precise indexing of the blank following the cutting of each tooth. In addition, when cutting a curved tooth it is desirable that the rotary cutter be supported at an angle away from the horizontal, (when the axis of the cutter is generally horizontal and when the cutter is being fed in a generally horizontal direction into the periphery of a blank which is supported on another horizontal axis at right angles to the axis of the cutter). This tipping of the cutter is sometimes necessary in the cutting of certain teeth in order to obtain a desired pressure angle for the teeth being cut in the blank.

The apparatus in general includes means for supporting and rotating a cutter of the hollow mill type about a horizontal axis while simultaneously feeding the rotating cutter into the periphery of a circular blank, means for supporting the circular blank on a horizontal axis disposed at right angles to the axis of the rotating cutter, means for automatically indexing the blank after each tooth has been cut, and means for positively locking the blank in a particular indexed position during actual cutting.

It is a general object of this invention to provide fully automatic mechanism for performing the above functions including a correlated drive for the various parts of the machine, and actuating members which are automatically acted upon to cause timed operation of each part of the machine at a particular time during the cycle of operation.

A more specific object of the invention is to provide in apparatus of the class described, including a rotary indexing disk associated with the blank and including a locking pin engageable with said indexing disk to hold the same in a predetermined position during cutting of the blank, a cyclical operation including means operable in response to movement of the cutter away from the blank after a tooth has been cut for withdrawing said locking pin, means for subsequently rotatably indexing the blank while the locking pin is withdrawn, means for re-engaging said locking pin with the indexing disk after indexing, and means for again feeding the rotary cutter into the work to cut an additional tooth therein while the work is held in fixed indexed position.

A further object of the invention is to provide in a device of the class described, means whereby the support for the rotary cutter may be adjusted vertically with respect to the work, longitudinally with respect thereto, and angularly—whereby the exact position of the rotary cutter best suited for a particular piece of work may be obtained.

A further object of the invention is to provide apparatus as above described wherein the position of the support for the work may be accurately varied either vertically or laterally.

A further more specific object of the invention is to provide apparatus wherein the actuating connections between the cutter feed table and the indexing fixture are so arranged and constructed as to permit feed movement of the table without causing undesired movement of said actuating connections and as to permit relative adjustment or tilting between the feed table and the work support.

A further object of the invention is to provide apparatus as above described having an indexing disk so constructed and cooperable with the rest of the apparatus as to permit cutting of a selected number of teeth in the blank, such for example as cutting a twenty-eight tooth, a thirty-seven tooth, or a forty-three tooth gear or cutter.

A further object of the invention is to provide apparatus for manufacturing toothed elements wherein teeth on opposite sides of a circular blank may be cut simultaneously to thereby expedite completion.

Other objects of the invention are to provide apparatus which can be economically driven by a small size electric motor; to provide apparatus which when operating requires no supervision until the work on a particular blank is completed; and to provide apparatus which is capable of utilizing an indexing disk of relatively large diameter to thereby reduce the seriousness of any slight error in the setting of the machine.

With the above and other objects in view, the invention consists of the improved apparatus for manufacturing tooth elements, and all its parts and combinations as set forth in the claims, and all equivalents thereof.

In the accompanying drawings illustrating one complete embodiment of the preferred form of the invention, in which the same reference numerals designate the same parts in all of the views, Fig. 1 is a perspective view of the improved apparatus looking principally at one side thereof, only a fragment of the second cutter table being shown;

Fig. 2 is a perspective view of the apparatus looking principally at the opposite side thereof, part being broken away;

Fig. 3 is an enlarged vertical sectional view taken approximately on the line 3—3 of Fig. 1;

Fig. 4 is an edge view of the indexing cam;

Fig. 5 is a vertical sectional view on an enlarged scale taken on the line 5—5 of Fig. 2, part being broken away;

Fig. 6 is a top view of the cam drum and associated parts while said parts are in the position of Fig. 1, parts being broken away;

Fig. 7 is a fragmentary front view showing the cam drum in the same position as in Fig. 6 and also showing the feed cam cooperable with the bottom pin;

Fig. 8 is a side elevational view of the indexing fixture;

Fig. 9 is a front view of said indexing fixture, parts being broken away;

Fig. 10 is a sectional view taken on line 10—10 of Fig. 8;

Fig. 11 is an enlarged fragmentary sectional view taken on line 11—11 of Fig. 9;

Fig. 12 is a partially diagrammatic view in perspective showing the cam drum and actuating connections with the indexing fixture,—the feed table being in a withdrawn position, with the cutter out of engagement with the work and the indexing disk being locked;

Fig. 13 is a side view of the cam drum showing the position of the parts after the cam drum has rotated approximately three-quarters of a revolution from the position of Fig. 12. With the cam drum in the position of Fig. 13 the cutter is now fully into the work and all other actuating connections are in the same position of Fig. 12;

Fig. 14 is a view similar to Fig. 12, showing the third stage in the cycle of operation. Here the quick return cam has engaged the bed plate pin to cause withdrawal of the feed table to pull the cutter out of the work. At the same time the index release block on the cam drum has caused movement of the actuating link for the indexing disk locking pin to disengage the latter from the indexing disk;

Fig. 15 is a view similar to Fig. 14, showing the fourth stage in the cycle of operation. Here the indexing cam has caused rotary indexing movement of the indexing disk one notch, and the index locking cam on the cam drum is about to cause return of the indexing disk locking pin into locking position; and Fig. 16 is a view looking at a face of a blank showing the rotary cutters in proper adjusted position cutting teeth in opposite sides of the blank.

*The supporting frame and frame adjustments*

Referring more particularly to the drawings, there is a base 20 having upstanding side walls 21, the upper edges of which are flanged outwardly as at 22. Supported on said flanges is a bed 23 having a dovetail recess 24 in its upper surface and extending longitudinally thereof. Shims 25 are interposed between the bed and the flanges 22, and by selecting shims of a desired thickness the elevation of the bed may be varied. Extending downwardly from the side edges of the bed and overlapping the side walls 21 of the base are side plates 26. These plates have their inner sides notched out to provide shoulders 27 which overlap and rest on the shims 25. The lower edges of the side plates 26 are equipped with inwardly extending flanges 28 which have adjustment bolts 29 threaded therein. The bolts 29 are adapted to engage filler blocks 30, as shown in Fig. 5.

Loosely resting on the shims 25 beneath the forward end of the bed plate are supporting blocks 31 having upwardly extending portions 32 (see Figs. 2 and 5). The extensions 32 are recessed to each receive a pivot pin 33. The blocks 31 are accommodated in recesses 34 in the bottom of the bed plate communicating with the end thereof, and said recesses have center extensions of sufficient height to freely accommodate the block extensions 32 and the portions of the pivot pins 33 resting on said block extensions (see Fig. 5). The inner end of each pivot pin is journalled in a bearing opening 35 of the bed plate, and the outer end of each pivot pin is journalled in a pivot opening 36 of each side plate 26. In addition, the portion of each pivot pin 33 which rests on the block 31 is rigidly secured to said block against turning movement by a bolt 37. The weight of the machine parts above the blocks 31 will normally hold the same in a flat position on the shims 25, but the side plates 26 and bed 23 can pivot on the pivot pins 33 when the opposite end of the bed plate is tilted upwardly in a manner to be hereinafter described, and when of course, the bolts 29 shown in Fig. 5 are loosened. The construction of these pivots is also such that if the bed plate is adjusted longitudinally the block 31 supporting the pivot pins can slide longitudinally along the shims 25.

For the purpose of varying the normal elevation of the bed plate, a crank 38 (see Fig. 2) is provided, which operates to rotate a shaft 39. This shaft carries a worm 40 (see Fig. 5), which cooperates with a worm wheel 41. When the worm wheel is rotated in response to operation of the crank 38, a jack screw 42 may be moved upwardly to press against the bottom of a pan 43. The pan in turn presses against the bottom of the bed plate to raise the latter upwardly, providing the set screws 29 are loosened. When raised upwardly thicker shims may be substituted for the shims 25 to support the bed plate at a higher elevation.

Brackets 44 (see Fig. 5), extending downwardly from the bottom of the bed plate, are apertured to receive the trunnions 45 of a nut 46, and a longitudinal screw 47 is threaded in said nut. The screw 47 has an unthreaded portion 48 projecting through the outer end of the machine and equipped with a crank 49 (see Fig. 2). By rotating the crank 49 the bed plate may be moved longitudinally to a desired position, provided the set screws 29 are loosened. A dial 50 may be utilized to aid in obtaining a desired longitudinal adjustment. By having the longitudinal adjustment screw 47 cooperate with a pivoted nut 46, the nut can readily adapt itself to any minor vertically adjusted position of the bed plate 23 or to any tilted position of said bed plate. In addition, where there is a major change in the elevation of the bed plate 23 through operation of the vertical screw 42, the bolts 50' adjacent the crank 49 (see Fig. 2) may be loosened. These bolts extend through vertical slots in a plate 51. The latter plate overlaps a vertical slot 52 in the base structure. Thus when the bolts 50 are loosened the crank shaft 48 and plate 51 may be moved up or down with respect to the slot 52. The construction of the adjustable plate 51 is the same as the construction of the plate 63, fully shown in Fig. 1 and to be hereinafter described.

A feed table 53, having its bottom of dovetail shape to cooperate with the dovetail slot 24 of the bed 23, is supported on the bed plate as shown in Figs. 3 and 5, and said feed table 53 has spaced upright extensions 54 and 55 the upper ends of which support a top 56.

The structure just described is preferably duplicated on the other side of the apparatus, as indicated in Fig. 1 which shows a fragment of a second feed table 57. It is to be noted, however, that the feed table 57 is at a normal elevation substantially higher than the feed table 53. Otherwise the structure on the other side of the machine is the same, and it is needless to duplicate the showings in the drawings or in the description.

Between the feed tables 53 and 57 (see Fig. 1) is a transversely extending bed plate 58 having keyways 59 therein. A base block 60 for supporting the indexing fixture and the work is positioned on the transverse bed 58. The base 60 has a keyway 61 in its lower side with a key 62 therein which also cooperates with the keyway 59 in the bed. Thus the base 60 may be moved longitudinally of the bed 58 and transversely of the rest of the apparatus.

A plate 63 is vertically adjustably secured by bolts 64 to an end of the bed 58, and said bolts cooperate with vertical slots 65 in the plate 63. An adjustment screw 66 has one end threaded into the base 60 for the work support and indexing fixture and has its outer end unthreaded and extending rotatably through the plate 63 and formed with a squared outer end 67 for the reception of a crank. A dial 68 may be associated with the projecting unthreaded end of the screw. By rotating the screw 66 a precise adjustment of the base 60 on the bed 58 may be obtained. In addition, if it is desired to elevate the base 60, the bolts 64 may be loosened, the base 60 may be raised above the bed 58, and a shim of desired thickness may be inserted. The shim may be provided with keyways for cooperation with the keyways 59 of the bed and 61 of the base. The base 60 is provided with spaced upright extensions 69 and 70 through the upper ends of which a shaft 71 is journalled.

In order to conveniently effect a desired amount of tilting of the bed 23 and side plates 26 on the pivot pins 33 there is a shaft 72 journalled transversely through the side plates as shown in Figs. 1 and 2, and more particularly in Fig. 1. This shaft has three eccentrics 73 keyed thereon, and these eccentrics rotate in circular openings 74 of blocks 75. When the crank 76 is turned to bring the wide portions of the eccentric 73 toward the bottom, then the side plates 26 and bed 23 will tilt about the pivot pins 33. Such tilting is sometimes desirable in order to cause tipping of the rotary cutter with respect to the work. A dial 77 associated with the shaft 72 may be used to aid in determining whether a desired amount of tipping has been obtained.

The drive

The apparatus is driven by a relatively small electric motor 78 mounted on the cover 56 of the feed table. Through suitable gearing within a gear box 79 the motor drives a shaft 80 having a pinion 81 fixed on its outer end and having a bevel gear 82 fixed on its inner end. The pinion 81 cooperates to drive a train of gears 83, 84, and 85. The gear 85 is rigidly mounted on one end of a cutter shaft 86, and said cutter shaft is journalled in bearings formed in the uprights 54 and 55. The cutter shaft 86 is adapted to carry a rotary cutter 87 on its inner end, and said cutter may be of any desired type, such as the type shown in Fig. 1 or the type indicated at 88 in Fig. 2. Both of these cutters are generally of the hollow mill type.

The bevel gear 82 drives a horizontally disposed bevel gear 89, and said bevel gear in turn drives a chain of gears 90, 91, and 92. Gear 92 is rigidly mounted on the upper end by a vertical shaft 93, and the shaft 93 carries a rigidly mounted worm 94 (see Fig. 2) which drives a worm wheel 95 mounted rigidly on a shaft 96 for the cam drum 97.

The automatic table feed

The cam drum 97 is rigidly mounted on its shaft and is provided with a table feed cam 98 thereon (see Figs. 6 and 7), which extends approximately three-quarters of the way around the drum. The cam 98 is cooperable with a bed plate pin 99, as shown in Fig. 7. This pin is rigidly connected to the bed plate 23 and extends upwardly through an elongated opening 100 in the table bottom 53. As the drum 97 rotates in the direction indicated by the arrow in Fig. 7, the gradually increasing width of the feed cam 98 will cause pushing of the drum and feed table toward the right, referring to Fig. 7. At the wide end of the feed cam 98 there is a distance where the feed cam is of substantially the same width, creating a dwell after the feed table is fed fully inwardly. Movement of the feed table as just described of course causes movement of the rotary cutter 87 or 88 to a position fully into the work, or as shown in Fig. 16. While the rotary cutter is being fed into the work it is of course rotating so that a tooth is being cut as it progresses inwardly.

The cam drum is also equipped with a quick return cam 101 which is best illustrated in Fig. 13. When the wide end of the feed cam passes the bed plate pin 99, then shortly thereafter the pin is engaged by the angular face 102 of the quick return cam to cause movement of the drum and feed table to the left, referring to Fig. 13, and withdrawal of the cutter from the work. This feed and return movement of the table is of course permitted by the sliding dovetail mounting of the table bottom 53 in the dovetail recess 24 of the bed plate.

The indexing mechanism

The shaft 71 is adapted to support on one end a blank 103 to be operated upon. This blank may be removably secured to the shaft in any desired manner so that when the shaft 71 is rotated the blank will also be rotated. On the opposite end of the shaft 71 is an indexing disk 104. This indexing disk has one or more sets of indexing holes therein. In the preferred embodiment of the invention there is an inner set 105 which preferably comprises 28 holes for indexing a twenty-eight-tooth gear or cutter; an intermediate set 106 which preferably comprises thirty-seven holes for indexing a thirty-seven-tooth gear or cutter; and an outer set 107 preferably comprising forty-three holes for indexing a forty-three-tooth gear or cutter. Pins 108 are removably insertable from the inner side of the indexing disk into the set of holes being utilized. In Fig. 8 these pins are shown as inserted in the outer set of holes 107. These pins extend only part way through the thickness of the indexing disk. The projecting ends of the pins are formed on one side with a rounded taper 109, as shown in Fig. 11.

Referring now to Fig. 3, the cam drum shaft 96 has an indexing cam 110 keyed thereto. This cam has a tapered surface 111 which merges into a portion 112 of full thickness, and the portion 112 constitutes a dwell in the cycle of operation. The cam is cooperable with a roller 113 extending from the lower side of a lever 114. The lever has one end pivoted as at 115 and has a portion on the opposite side of the roller guided in a slot 116 of a guiding block 117. The free end of the lever has a ball and socket connection 118 with an actuating link 119. This link comprises two overlapping sections which have cooperating serrated surfaces held in a desired overlapping position by a bolt 120 which is engageable with any one of a plurality of selected apertures (see Fig. 1). The effective length of the link 119 may therefore be varied. The other end of the link has a universal connection 121 (see Fig. 8), with the outer end of the lever 122, and said lever 122 has its inner end connected to a rock shaft 123, which shaft is mounted for oscillating movement in the uprights 69 and 70 of the indexing fixture. Another lever 124 is carried on the rock shaft 123, and adjustably connected to the outer end of said lever, in either one of the openings 125 or 126, is an indexing dog 127. The angular position of the dog 127 may be varied by manipulation of a set screw 128, as shown in Fig. 9. The outer end of the dog has a transversely extending tubular portion 129 within which a latch member 130 (see Fig. 11) is slidably mounted against the tension of a spring 131 which normally urges the latch outwardly. The latch 130 has one side concavely tapered, as at 132, to slip over the corresponding taper 109 of the pins 108 when the latch is moved to the left referring to Fig. 11. The other side of the latch is slightly concavely recessed, as at 133, to cooperate with the curvature of the pins 108, as shown in Figs. 9 and 11. A screw 134 projects from the latch through a slot 135 in the tubular portion 129. This slot is of considerably greater width than the screw, to allow a slight rotary movement of the latch during operation.

It is obvious that when the cam drum shaft 96 is rotating in the direction of the arrow of Fig. 3, that as the roller 113 rides up the inclined surface 111 the free outer end of the lever 114 will be swung toward the indexing fixture, moving the actuating link 119, causing rocking of the rock shaft 123 and movement of the lever 124 to push the indexing dog 127. This will cause rotatable indexing movement of the indexing disk 104 and blank 103 a distance equal to the distance between two of the pins 108. After the high portion 112 of the cam 110 leaves the roller, then the weight of the lever arm 124 aided by a return spring 124' will cause movement of the lever 124 to the left, referring to Fig. 9, and the latch 130 will slip over one of the pins and re-engage the other side thereof ready for the next indexing stroke.

Referring to Fig. 8, there is mounted on the base 60 a block 136 having a dovetail recess 137 in its upper surface. An upright holder 138 has its bottom dovetailed, as at 139, to cooperate for sliding movement in the dovetail recess 137 of the block 136. A rod 140 has its outer end extending through the bottom of the holder 138 and rigidly connected thereto. The rod 140 is slidable in bores 141 and 142 of the upright members 69 and 70. Thus longitudinal movement of the rod 140 causes movement of the holder 138 toward or away from the indexing disk 104.

An adjustment block 143, positioned on one side of the holder 138, has a stem portion 144 slidable in a slot 145 of the holder 138. A bolt 146 extending through the stem 144 of the block and through a plate 147 on the opposite side of the holder 138 is adapted to hold the adjustment block 143 in a desired position of vertical adjustment when a nut 148 is tightened against the plate 147. Thus the position of the block 143 may be varied in a vertical direction to cooperate with any one of the sets 105, 106, or 107 of indexing holes in the indexing disk.

An index locking pin 149 extends slidably through the block 143 and has its outer end slidable in an aperture of a bracket 150. A cotter pin 151 engaging a washer 152 at one end of a coil spring 153 causes any outward sliding movement of the locking pin to be against the tension of said spring 153. This spring is of relatively great strength and is only useful to permit yielding movement if the inner end of the locking pin should fail to enter one of the holes of the indexing disk through some error in adjustment. Thus the spring is a safety factor to prevent breakage of parts.

Referring now to Figs. 6 and 7, there is a rod 154 extending longitudinally of the cutter table with its ends slidable in openings 155 and 156 of the cutting table uprights 54 and 55. A block 157 is rigidly and non-slidably connected to an intermediate portion of the rod 154, and a pin 158 projects inwardly from one end of the block 157. The other end of the block is connected by a ball and socket fitting 159 with an actuating link 160. This link is formed of a plurality of sections which are adjustably connected at 161 to provide for variance in the effective length of the link 160.

The opposite end of the link 160 is connected by a ball and socket joint 162 (see Fig. 8) with a bell crank lever 163. The bell crank lever is pivoted on a block 164 and has its other arm pivotally connected as at 165 (see Fig. 10) with a transverse slide 166 in a block 167. The block 167 is rigidly and non-slidably connected to the rod 140, which causes inward and outward movement of the index locking pin holder 138.

Referring again to Fig. 6, as the cam drum rotates in the direction indicated by the arrow, the index locking cam 168 thereon engages the pin 158 to move the block 157 and shaft 154 toward the right, referring to Fig. 6. This causes similar movement of the actuating link 160, swinging movement of the bell crank 163, movement of the rod 140 to the left and to the position of Fig. 10, movement of the holder 138 toward the indexing disk 104 and entrance of the locking pin 149 into one of the holes 107 of the indexing disk, as shown in Fig. 8.

After the cam 168 on the cam drum 97 leaves the pin 158 the locking pin will remain in locking position in the indexing disk, holding the indexing disk and work in a particular indexed position until after a tooth has been cut in the work. After such tooth has been cut, the cutter table 53 will be automatically moved to the left, referring to Fig. 1, because of action of the quick return cam 101 as heretofore described. By the time this movement takes place, however, an index release member 169 will be in a position adjacent the pin 158, as shown in Fig. 14. Thus as the cutter table and cam drum move toward the left, as shown in Fig. 14, the index release block will carry the pin 158 with it to cause movement of the actuating link 160, swinging of the bell crank 163 in a direction to push the index locking pin holder 138 to the right, referring to Fig. 8, to cause withdrawal of the index locking pin 109 from the hole with which it was engaged in the indexing disk. This release always takes place before the indexing dog operates to advance the indexing disk one notch.

Dual cutting arrangement

While the apparatus may comprise only the mechanism shown in Fig. 2 for cutting one tooth at a time, nevertheless by duplicating the structure on the opposite side, as indicated by the second cutter table 57 of Fig. 1, which cutter table supports a cutter shaft 170 having a cutter 171 mounted on the end thereof, then it is possible, due to the particular arrangement of the device, to cut teeth on opposite sides of the blank simultaneously as indicated in Fig. 16, wherein a different type of cutter 88 and 172 is shown. Where a dual machine is employed, the cutter shaft will be rotated by mechanism identical to that heretofore described on the first side of the machine, and a cam drum like the cam drum 97 will be rotated in the same manner as the method of rotating cam drum 97. Said cam drum will be equipped with a feed cam identical to the feed cam 98 and with a quick return cam identical to the cam 101. The cams 168 and 169 may, however, be omitted, and the indexing cam 110 may also be omitted, together with associated parts, because it is sufficient to have the indexing controlled from one side of the machine. The drive for the table 57 and cutter shaft 170 must be timed to coincide perfectly with the movements on the other side of the machine.

Operation

In operation a blank 103 of desired size is rigidly connected to the shaft 71 in any desired manner, as shown in Fig. 2. Next a selected type and size of hollow mill cutter is inserted on the cutter shafts 86 and 170. It is then necessary to lower the table from the position shown in Fig. 2 to bring the cutter 88 to a desired position of elevation with respect to the blank, and a proper final position is shown in Fig. 16. This lowering is accomplished by operation of the jack 42 and by a change in the thickness of the shims 25, or a desired position may be obtained by elevating the work supporting base 60 through insertion of a shim of desired thickness therebeneath, as heretofore described. The table 57 for the opposite cutter 171 or 172 must then be raised through operation of the jack 42 on the other side of the apparatus and through use of shims of desired thickness corresponding to the shims 25 of Fig. 5. A correct final position for the cutter 172 is illustrated in Fig. 16. The tables, however, are of course in a withdrawn position so that the cutters are out of engagement with the work.

In order to adjust the lateral position of the work 103 with respect to the cutters, the screw 66 may be rotated to obtain a correct position. In addition at the time of setting up the work the starting position of the tables 53 and 57 should be adjusted longitudinally by an operation of the crank 49 on one side of the machine and the corresponding crank on the opposite side. Also, if it is desired that the cutters be tipped with respect to the work, which is frequently necessary in cutting curved toothed elements, then the crank 76 should be operated on one side and the corresponding crank on the opposite side to effect a desired tipping of the cutters with respect to the work. During the making of some of these adjustments it may be necessary to loosen the sections of the actuating links 119 and 160 and then re-set said links to a required length by tightening the adjustment bolts. After all of the adjustments have been made, all of the set screws and bolts associated with adjustable members should be tightened to lock the parts in the desired position.

The electric motor 78 is then started, and this will cause rotation of the cutter 87 or 88, and the drive on the other side of the apparatus is simultaneously started to cause rotation of the cutter 171 or 172. The cam drums will also start in operation. Referring to Fig. 12 illustrating the first position in the cycle of operation, the cutter table is in a withdrawn position, the index locking pin 149 is in engagement with the indexing disk 104, and the indexing cam 110 is out of engagement with its roller. As the cam drum 97 rotates from the position of Fig. 12 to the position of Fig. 13 the rotating cutter will be fed from withdrawn position to a position fully within the work, as shown in Fig. 16, to cut a tooth of desired depth. As heretofore pointed out, the wide portion of the feed cam 98 has a dwell part of uniform thickness when the cutter is fully within the work to insure completion of the cut. As soon as the cutting of the tooth has been completed, the wide part of the feed cam 98 will leave the bed pin 99. The bed plate pin 99 will then be engaged by the angular surface 192 of the quick return cam 101, as shown in Fig. 14, to cause movement of the cutter table toward the left, referring to Fig. 14, and withdrawal of the cutter from the work. During this operation the block 169 on the cam drum 97 will be in engagement with the pin 158, as shown in Fig. 14, to cause movement of the index locking pin 149 out of engagement with the indexing disk 104, as shown in Fig. 14.

By this time the indexing cam 110 is again engaging the roller 113, and as the roller rides up the incline 111 of the indexing cam the indexing disk will be rotatably indexed the distance between two pins thereon, as shown in Fig. 15. As soon as the indexing has been completed and the indexing cam 110 has left the roller 113, then the index locking cam 168 engages the pin 158, as shown in Fig. 12, to re-insert the index locking pin 149 in the next hole of the indexing disk 104. This locking of course is completed before the cutter again enters the work. The cycle of operation is then repeated until all teeth have been cut.

The cutter 171 or 172 on the other side of the apparatus of course moves into and out of the work in unison with the cutter 87 or 88.

The use of the hollow mill type of cutter shown in Fig. 16 will cause cutting of teeth which are curved transversely of the thickness of the blank 103, and with the use of the present apparatus this type of tooth can be accurately cut with a proper pressure angle, and curved toothed gears can also be made. The cutting of curved teeth has heretofore been considered impossible from a practical standpoint.

Although only one form of the invention has been shown and described, it is obvious that various changes and modifications may be made without departing from the spirit of the invention, and all of such changes are contemplated as may come within the scope of the claims.

What I claim is:

1. In an apparatus for cutting toothed elements, a rotary cutter, a rotatable shaft supporting said cutter, means for feeding said cutter in a direction longitudinally of the cutter shaft while the cutter is rotating, means for rotatably supporting a circular blank in such a position that the rotary cutter is fed into the periphery of the blank while rotating in a direction transversely of the thickness of the blank, means for automatically locking the blank in an indexed position and against rotation before it is engaged by the cutter and while the cutter is being fed in a direction axially of the cutter into the periphery of the blank to the depth of the tooth being cut, means for automatically withdrawing the cutter from the blank after a tooth has been cut therein, means for automatically releasing said index locking means upon withdrawal of the cutter, and means for thereafter automatically rotatably indexing the blank, there being a single rotatable member movable with the cutter in a direction longitudinally of the cutter axis for initiating and timing the cutter feeding, the index locking, the cutter withdrawal, the index unlocking, and the indexing movements.

2. In an apparatus for cutting toothed elements, a cutter, a movable table supporting said cutter for rotation and for movement with the table in a direction axially of the cutter, a bed on which said table is movable, said bed having a projection, rotatable timing mechanism carried by the movable table and having cam means engageable with said bed projection to feed the table and cutter outwardly and inwardly with respect to the work in a direction longitudinally of the axis of the cutter, a prime mover supported on the movable table and transmission means connected to said prime mover for rotating said cutter and timing mechanism.

3. In an apparatus for cutting toothed elements, a rotatable work support, a cutter, a movable table supporting said cutter for rotation and for movement with the table in a direction axially of the cutter toward the work, a bed on which said table is movable, said bed having a projection, rotatable timing mechanism carried by the movable table and having cam means engageable with said bed projection to feed the table and cutter outwardly and inwardly with respect to the work support in a direction longitudinally of the axis of the cutter, a prime mover supported on the movable table, transmission means connected to said prime mover for rotating said cutter and timing mechanism, and means driven by said timing mechanism for indexing the work support and for locking said support in indexing position at predetermined times in the cycle of operation.

4. In an automatic apparatus for cutting toothed elements, a rotatable support for work to be cut, a rotatable cutter, means for feeding said cutter into and out of the work, an indexing disk having indexing holes and rotatable with said work support, a slide movable in a direction axially of the indexing disk, an index locking pin connected to said slide, and means including a bell crank lever for causing movement of the slide and locking pin to move the latter into and out of an indexing hole at a predetermined time with reference to the feed movement of the cutter.

5. In an automatic apparatus for cutting toothed elements, a rotatable support for work to be cut, a rotatable cutter, means for feeding the cutter into and out of the work, an indexing disk rotatable with the work support and having a circle of pins projecting from a face thereof, means including a reciprocally movable indexing dog cooperable with one of said pins to cause rotatable indexing movement at a predetermined time with reference to feed movement of the cutter, said indexing disk also having indexing holes, a slide movable in a direction axially of the indexing disk, an index locking pin connected to said slide, and means for causing movement of the slide and locking pin to move the locking pin into an indexing hole after indexing and out of an indexing hole at a predetermined time with reference to feed movement of the cutter.

6. In an automatic apparatus for cutting toothed elements, a rotatable support for work to be cut, a rotatable cutter, means including a rotatable drum movable axially with the cutter for feeding said cutter into and out of the work, an indexing disk having indexing holes and rotatable with said work support, a locking pin holder movable in a direction axially of the indexing disk, an index locking pin carried by said holder, and means engaged by said drum during its axial movement for causing movement of the locking pin holder to move the locking pin into and out of an indexing hole at a predetermined time with reference to feed movement of the cutter.

7. In an automatic apparatus for cutting toothed elements, an axially movable rotatable cutter, a rotatable support for work to be cut, a rotatable timing drum supported for axial movement with the cutter, cutter feeding and return cam means on said drum, means engaged by said cam means for causing movement of the cutter into and out of the work, an indexing cam rotatable with said drum, means engaged by said indexing cam for rotatably indexing the work support prior to engagement of the cutter with the work, index locking and unlocking means on said drum, and mechanism engaged by said means for causing locking and unlocking of the work support at predetermined times in the cycle of operation.

8. In an apparatus for cutting elements, a cutter, means supporting the cutter for rotation and for movement in a direction axially of the cutter, means including a rotatable drum having cam means thereon for causing said axial movement of the cutter to feed and withdraw the cutter at predetermined times in the cycle of operation, means for rotatably supporting a circular blank in such a position that the rotary cutter is fed into the periphery of the blank while rotating in a direction transversely of the thickness of the blank, an indexing member supported for rotation with the blank, a pivoted lever having a swingable end, an indexing cam rotatable with the drum and cooperable with said lever at a predetermined time in the cycle of operation to cause swinging of the latter, and means operable by the swinging end of said lever and engaging with the indexing member for causing rotatable indexing movement of the latter.

9. In an automatic apparatus for cutting toothed elements a rotatable support for work to be cut, a rotatable cutter, means including a rotatable timing member movable axially with the cutter for feeding said cutter into and out of the work, and means including a member engaged by said rotatable timing member during the axial movement of the latter for causing locking of the rotatable work support in a rotatably indexed position at a predetermined time with reference to feed movement of the cutter.

EARNEST F. ABER.